United States Patent [19]

Berginski

[11] 4,423,297

[45] Dec. 27, 1983

[54] STEERING COLUMN SWITCH WITH FLASHER SWITCH

[75] Inventor: Werner-Ernst Berginski, Werdohl-Eveking, Fed. Rep. of Germany

[73] Assignee: Leopold Kostal GmbH & Co. KG, Luedenscheid, Fed. Rep. of Germany

[21] Appl. No.: 369,034

[22] Filed: Apr. 16, 1982

[30] Foreign Application Priority Data

May 30, 1981 [DE] Fed. Rep. of Germany ....... 3121659

[51] Int. Cl.$^3$ ...................... H01H 9/00; H01H 15/00
[52] U.S. Cl. ............................................... 200/61.54
[58] Field of Search ............ 200/4, 16 F, 16 C, 16 D, 200/61.27, 61.54, 315

[56] References Cited

U.S. PATENT DOCUMENTS

| | | | |
|---|---|---|---|
| 3,639,706 | 2/1972 | Purdy | 200/16 F X |
| 3,643,043 | 2/1972 | Endow | 200/16 F |
| 3,824,355 | 7/1974 | Norman et al. | 200/16 F |
| 3,873,788 | 3/1975 | Machalitzky et al. | 200/61.27 |
| 3,944,765 | 3/1976 | Kawai et al. | 200/61.27 |
| 4,169,972 | 10/1979 | Black et al. | 200/315 X |
| 4,336,428 | 6/1982 | Berginski | 200/61.54 |

FOREIGN PATENT DOCUMENTS

1655067 11/1972 Fed. Rep. of Germany .
2220438 11/1976 Fed. Rep. of Germany .
2931903  2/1980 Fed. Rep. of Germany .

*Primary Examiner*—J. R. Scott
*Attorney, Agent, or Firm*—Robert E. Knechtel

[57] ABSTRACT

A steering column switch with a warning flashing switch that overlaps a steering column spindle. There is a conductor plate perpendicular to the axis of the steering spindle with an actuating member for the actuation of a slider switch provided in the peripheral wall of the steering column switch. In an annular section of the conductor plate there are contact heads on either side of the plate. The slider has a circular, segment-shaped cross section and is parallel with the axis of the steering column switch, and shiftable perpendicular to the plane of the conductor plate. The slider carries several contact bridges which cooperate with the contact heads of the conductor plate. Contact bridges on the conductor plate are non-flexibly held and fixed to the slider and establish stop positions of the slider when the contact bridge engages the contact heads on the conductor plate.

11 Claims, 17 Drawing Figures

STEERING COLUMN SWITCH WITH FLASHER SWITCH

BACKGROUND AND SUMMARY OF THE INVENTION

This invention relates to a steering column switch and more particularly to a steering column switch having a flasher switch as a part thereof.

Steering column switches which are particularly useful in automotive applications, are illustrated in German Patent Application No. 16 55 067, German Patent Application No. 29 31 903 and German Patent No. 22 20 438. These switches illustrate steering column switches which function to control the direction indicator switches. The warning flashing switch interacts directly with the functions of the direction indicator switch which causes difficulties with respect to the mechanical design of this switch. Particularly, the warning flashing switch impairs the position of the actuating members. The previous switches need large and extensive switching bridges, which necessitate the construction of the steering column switch being specially designed and adapted to combine all of these functions.

It is the object of this invention to design such a steering column switch that a warning flashing switch may be built into it without extensive redesigns or with a minimum amount of difficulty. The switching elements of the warning flashing switch should require within the steering column switch as little space as possible. This is necessary or the steering column switch would have to be redesigned and remanufactured in order to accommodate the warning flashing switch.

Applicant has solved these problems by providing a warning flashing switch within the steering column switch by supplying a conductor plate within the steering column switch. In a ring section of the conductor plate, contact heads are arranged on both the upper and lower sides of the conductor plate. A switching slider is slidably arranged in parallel to the shaft of the steering column switch and is thus perpendicular to the plane of the conductor plate. The switching slider has several contact bridges cooperating with the contact heads of the conductor plate. As the slider is operated from the steering column, the contact bridges which cooperate with the contact heads on the conductor plates open and close various electrical circuits. On the slider there are two contact bridges which are non-flexible and attached respectively to the slider on the opposite sides of the conductor plate. These contact bridges fix the respective stop positions of the slider. All other contact bridges are flexible to provide good contact between contact heads. The invention uses only a narrow annular area of the steering column switch. This makes it possible to arrange the actuating member on the upper side of the steering column between the normally positioned switching levers on the steering column. Normally one of these switching levers control windshield wiper functions, and the other controls the turn signals of the automobile. By positioning the actuating member at such a place, it excludes or minimizes the possibility of an erroneous actuation. The depth of the design of the warning flashing switch is extraordinarily small, as it amounts basically only to the thickness of the plate-shaped slider so that it fits easily into existing steering column switches. The invention thus does not require the redesign and remanufacture of present steering column switches, especially in that the conductor plate is designed to be used for the warning flashing switch. The conductor plate is suspended on the steering column switch as illustrated in the disclosure.

In one embodiment the warning flashing switch may be designed as a slider switch with the actuating member forming a part of the slider. In another embodiment, the actuating member is designed as a switching rocker member and is pivotal around a shaft. It meshes by tooth or geared racks into toothed rails of the slider.

To establish the stop positions of the slider, the slider mechanism is provided with yielding tongue-shaped members cooperating with a diamond-shaped locking profile which is fixed to the switch housing. The tongues are guided by designing the ends of the tongues in a crown or convex shape and the locking profile has a profile curve with a groove-shaped cross section to retain the ends of the tongues therein. The stop position of the rocker switch is fixed by providing the rocker switch with a locking profile that yieldingly or flexibly engages a cooperating locking piece positioned perpendicular to the shaft of the switching rocker.

The non-flexible contact bridges which function as stops for the slider are seated on pins of the slider. These contact bridges come in contact with the stationary conductor plate and establish the limits of travel of the slider in the direction of movement parallel to the steering column shaft. Other contact bridges are designed to be flexible to permit proper seating against the contacts on the conductor plate. These latter contact bridges can further be supported by springs to aid in their proper seating against the contacts on the conductor plate.

The invention also provides for a lamp contact bridge as part of the flexible contact bridges. The lamp contact bridge has a contact web that cooperates with a contact head which is fixed to a projection in a leg of the slider. This provides a safely locked contact which is secured in every switching position without having to tilt the slider to provide the safely locked contact.

These and other objects will become apparent on reading the brief description of the drawings and detailed description of the preferred embodiment.

DETAILED DESCRIPTION OF THE PREFERRED EMBODIMENT

Turning first to FIGS. 1-6 there is illustrated the basic design of a steering column switch 1. The steering column switch 1 is mounted on a steering column (not illustrated). Within a housing 2 (FIG. 2) is a conductor plate 3 that subdivides the inner space of the housing 2 into a lower chamber in which is placed a switching ring 4, which is normally used to control wiper functions, and an upper chamber in which is a turning direction indicator switching ring 5. The wiper switching ring 4 is operated by a switching lever 6 which is attached to it. The turning direction indicator switching ring 5 is operated by a switching lever 7 attached to it. The conductor plate 3 has extensions 8, 9 which are perpendicularly affixed to it and have switching elements or switching circuits on them. These extensions 8, 9 are adaptable to receive plug-in connectors. The diameter of the conductor plate 3 substantially corresponds to the inner diameter of the housing 2. Thus, within the housing 2, there is no room for normal placement of an additional warning flashing switch. The switching levers 6 and 7 are pivotal around and tiltable in an axial plane of the steering column. The steering wheel is mounted at the end of the steering column. These functions and operations are previously known and are, therefore, not more completely detailed herein.

Figure 1:
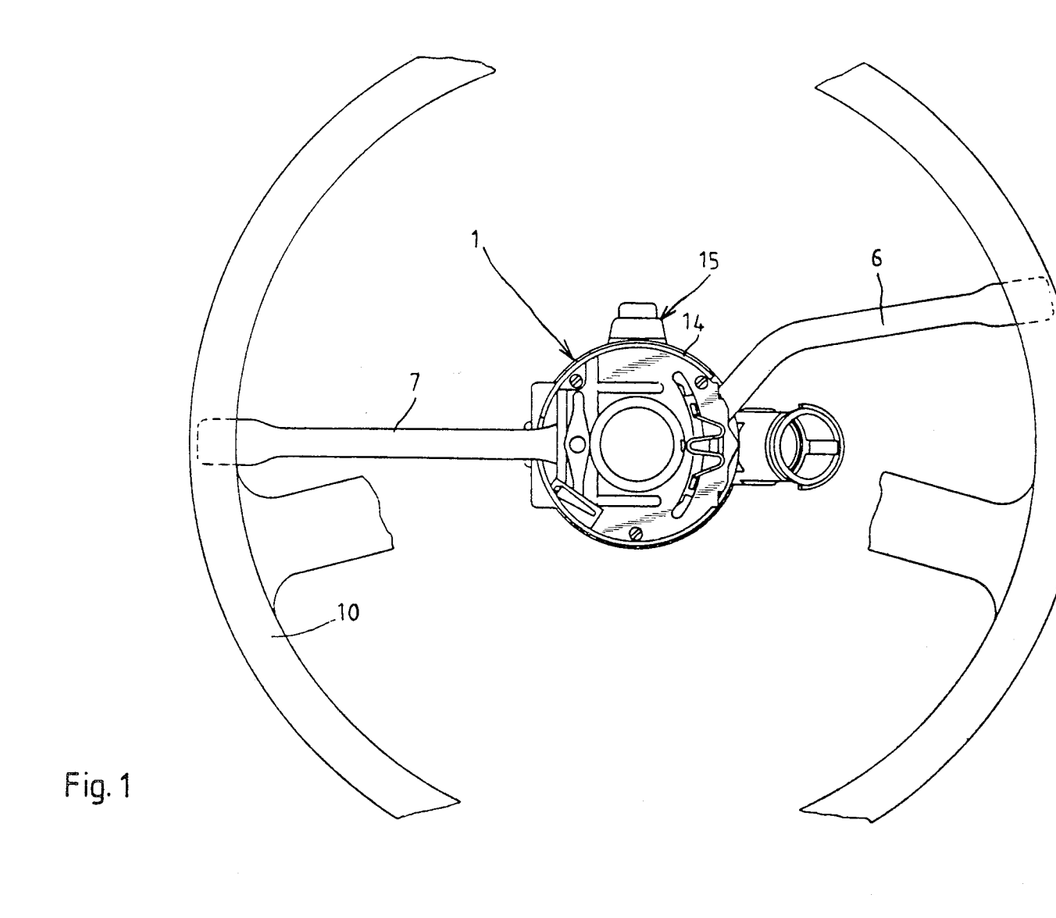
FIG. 1 is a partial schematic view, with portions removed, of a steering column switch mounted on a steering column.
Figures 2, 3, 4, 5, 6:
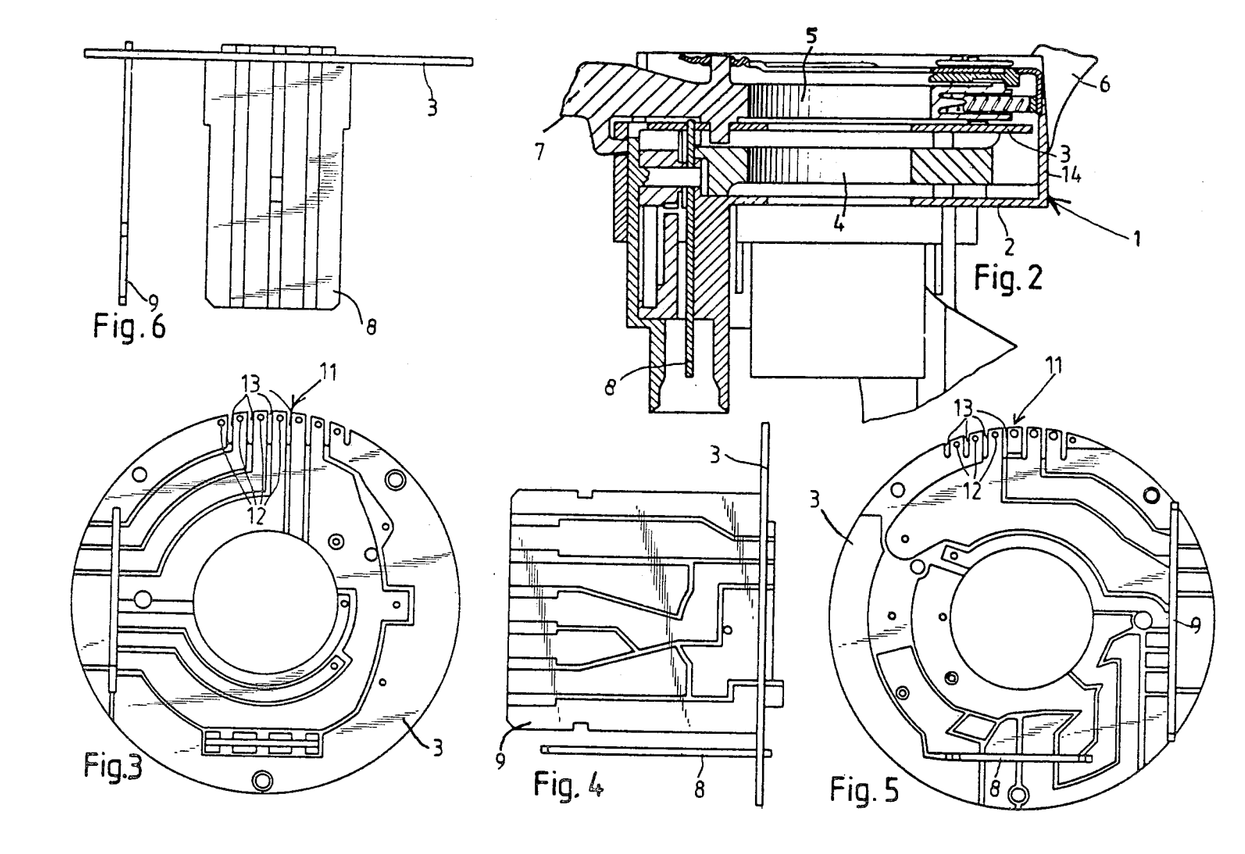
FIG. 2 is an enlarged cross-sectional view, with portions removed, of the steering column switch of FIG. 1.
FIG. 3 is a plan view of the conductor plate.
FIG. 4 is a right end view of the conductor plate of FIG. 3.
FIG. 5 is a bottom view of the conductor plate.
FIG. 6 is a bottom end view of the conductor plate of FIG. 3.
Figure 7:
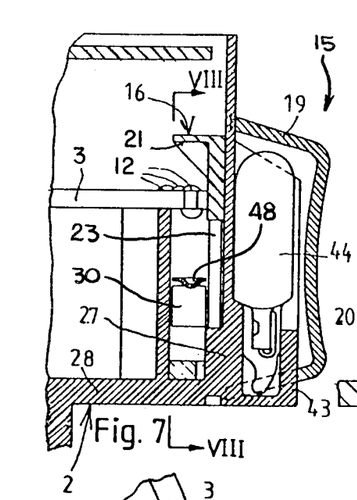
FIG. 7 is a sectional view, with portions removed, taken through the warning flashing switch.

Since the conductor plate 3 substantially and completely fills the inner cross section of the housing 2 in a radial direction, there does not remain any free space to add a separate warning flashing switch. In accordance with the invention, the conductor plate 3 is used to provide such a switch. This is accomplished by providing the respective contact heads 12 on an annular section 11 which is at the outer circumference of the conductor plate 3. As shown in FIGS. 3 and 5, the contact heads 12 are inserted through conductor paths which make up the electric current circuits. The contact heads 12 are placed on both lateral faces of the conductor plate 3. There are provided slots 13 between the contact heads 12 within the conductor plate 3, the function of which is more clearly explained below.

A peripheral wall 14 of the housing 2 is designed to receive an actuating member 15 (FIG. 1) for the warning flashing switch. This actuating member 15 is located on the upper side of the steering column outside the normal actuating range of the switching levers 6 and 7. This insures that an unintended actuation of the warning flashing switch does not occur. Moreover, an actuation of the warning flashing switch is possible only by the driver reaching through the steering wheel 10 or by encompassing the steering wheel. This requires special access by the driver which is possible with the vehicle at a standstill only.

The basic arrangement of the warning flashing switch enables the use of known steering column switches. The electric conductor paths of the conductor plate 3 must be modified in order to accommodate the additional circuits. In addition, the design must be made so that the actuating member 15 can be attached and operate the warning flashing switch. Within the inner space defined by the housing 2, there is very little if any space to install the warning flashing switch, however, Applicant has solved this problem as illustrated by the following individual examples.

One emodiment of the warning flashing switch is illustrated in FIGS. 7-10. In this embodiment, the actuating member 15 operates a sliding switch comprised of a slider 16 having thereon webs 17 which are slidably retained within the slots 13 in the conductor plates 3. The slider 16 is thus slidably guided in a direction perpendicular to the plane of the conductor plate 3. The slider 16 has pins 18 on it for affixing a cap 19 to the slider. The cap 19 is securely connected with the slider 16 and thus serves as the actuating member 15 for the warning flashing switch.

Figure 10:
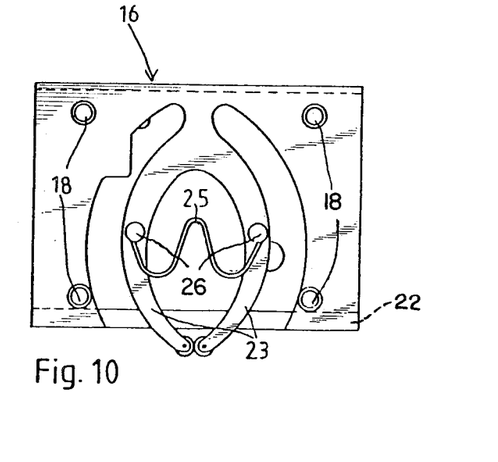
FIG. 10 is a front view of the slider switch.
Figure 11:
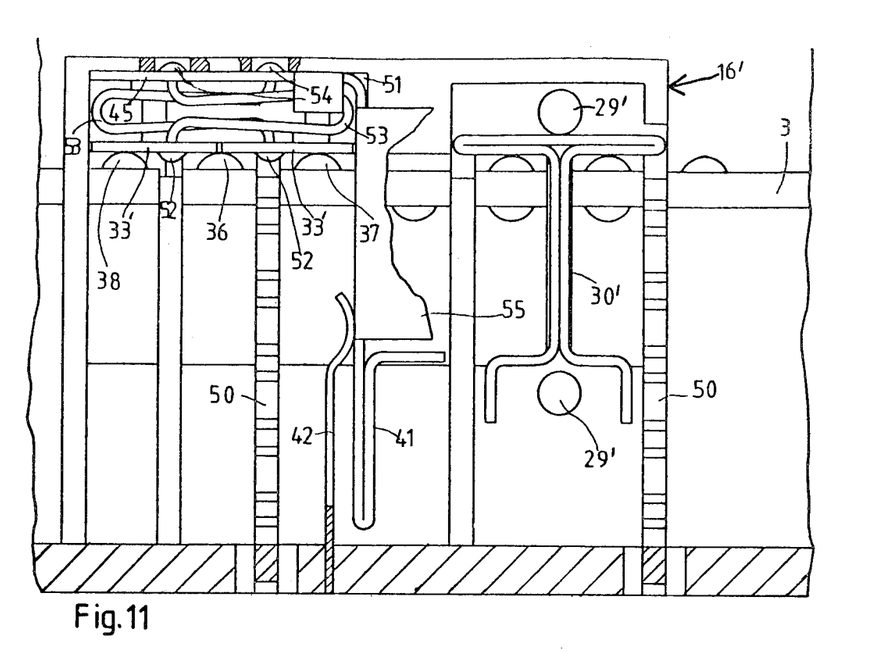
FIG. 11 is a front view, with portions removed, of an alternate embodiment of a warning flashing switch with the actuating member removed.
Figure 12:
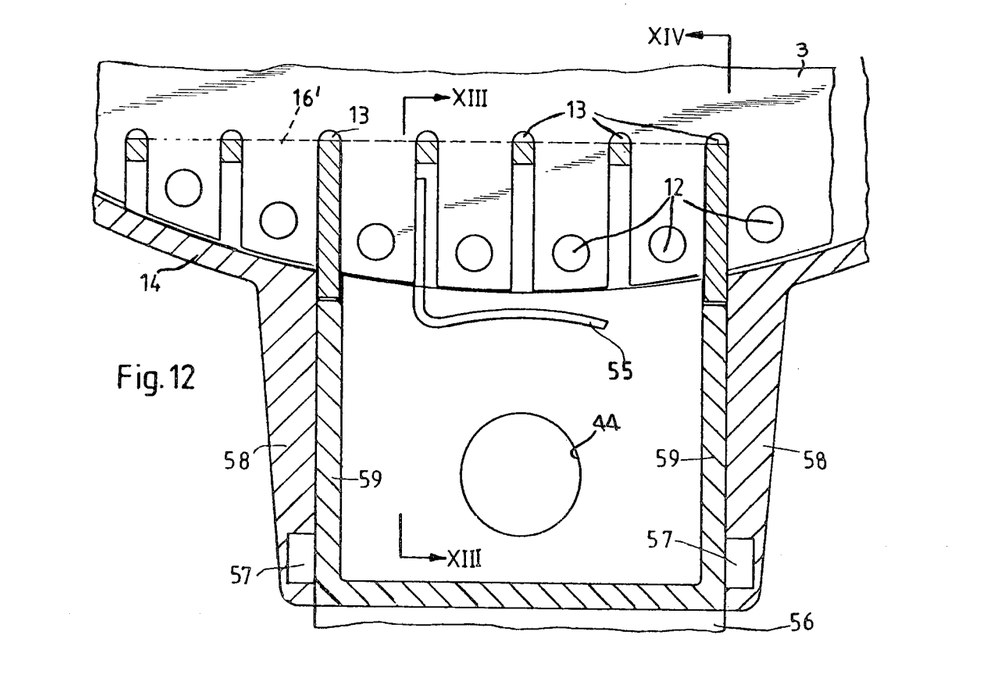
FIG. 12 is a plan view of the switch of FIG. 11 with portions removed.

The slider 16 includes an annular shaped plate 20 (FIG. 10) that is reinforced by a pair of ribs 21, 22. This plate 20 fits closely to the peripheral edge of the conductor plate 3 between the conductor plate 3 and the housing 3 so that only a narrow slot, corresponding to the thickness of the plate 20, is used within the housing 2 for the installation and the guiding of the flasher switch. Within a central section of the plate 20 there are formed two sickle-shaped yielding tongues 23 with ends 24. The cross section of the tongues 23 decreases toward the ends 24 so that the elasticity of them may be completely used. These tongues 23 can be further prestressed by a spring 25 that attaches to a pair of pins 26, as is indicated in FIG. 10.

The tongues 23 cooperate with a diamond-shaped locking profile 27 that is formed in the housing 2. The edges of the locking profile 27 has grooves formed in them for receiving and guiding the ends 24 of the tongues 23. The locking profile 27 ensures that the slider 16 will be forced resiliently into its stopping positions.

Figure 8:
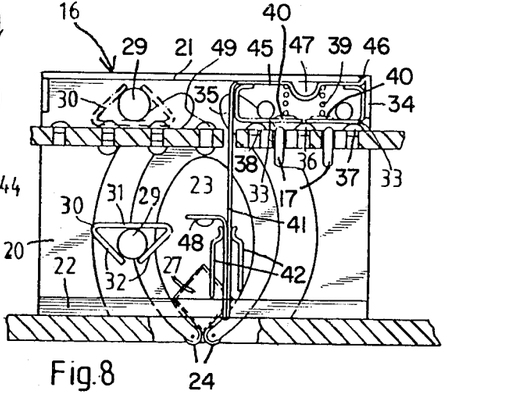
FIG. 8 is a cross-sectional view, with portions removed, taken along Line VIII—VIII of FIG. 7.
Figure 9:
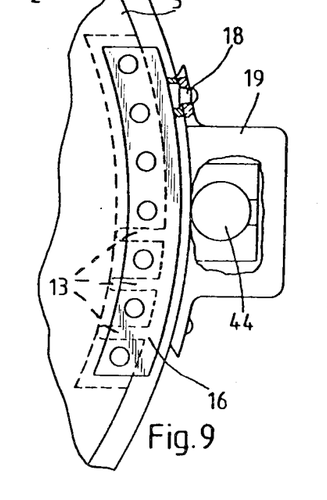
FIG. 9 is a top view, with portions removed, of the switch of FIG. 7.

The slider 16 has two pins 29 with contact bridges 30 connected thereto. The pins 29 are located above and below the conductor plate 3, respectively. The contact bridges 30 are triangular shaped, with a middle leg 31 which is of sufficient length to bridge pre-determined ones of the contacts 12, as more fully described below. The legs 32 of the contact bridges 30 clamp strongly to the pins 29. These contact bridges 30 are thus non-flexibly, unyieldingly supported and affixed to the slider 16. The contact bridges 30 act, on the one hand, together with the contact heads 12 on the respective upper and lower sides of the conductor plate 3, to determine the stop positions of the slider 16. The locking of the slider 16 in its stop positions occurs resiliently with the elastic tongues 20 stretched over and around the diamond-shaped contour of the locking profile 27. The lower stop position of the slider 16 is represented in FIG. 8 where the upper contact bridge 30 engages the contact heads 12 which prohibits further downward movement of the slider 16. Since the contact bridges 30 are held rigidly and the stop positions are fixed by the diamond-shaped profile 27, the remaining contact bridges must, therefore, be resiliently or flexibly formed in order to ensure a uniform contact pressure and to prevent a canting of the slider.

The slider 16 also carries two contact bridges 33. Each contact bridge 33 is formed generally J shaped, with the bottoms thereto positioned against the respective wall sections 34 and 35 and the one leg thereof positioned against the rib 21 of the slider 16. The other legs of the contact bridges 33 are held by the webs 17 and the free ends thereof are in contact with the contact head 36 and butt up against each other. Each contact bridge 33 also forms a bridge from the contact head 36 to a further contact head 37, 38 respectively. This ensures that the contact bridges 33 are always adjacent to the contact heads 36, 37 and 38 and equalize the differences of the height of the contact heads 36, 37 and 38. The contact pressure is ensured by a coil spring 39 that leans against beads 40 of the contact bridges 33. The beads 40 are in the end areas of the contact bridges 33 and assure that the coil spring 39 leans approximately equally against both contact bridges 33.

A lamp contact bridge 41 is disposed with its main part basically in parallel with the direction of the movement of the slider 16 and is slidably engaged on either side by two contact tongues 42. The contact tongues 42 extend into a socket wherein a lamp 44 is retained, and are coupled with the connection tongues of the lamp 44. A leg 45 of the lamp contact bridge 41 is engaged with the rib 21 of the slider 16 and its end extends into a recess 46 in the rib 21 in order to thereby fix the lamp contact bridge 41 in position. The leg 45 is engaged by the coil spring 39. In order to have the coil spring 39 fixed, a dimple 47 is formed in the leg 45 and extends into the open end of the coil spring 39. By this arrangement it is ensured that the lamp contact bridge 41 is cushioned when it is closed. A contact arm 48 of the lamp contact bridge 41 has a concavely formed contact area that cooperates with a contact head 49. The concave contact area serves for centering the contact arm 48 on the contact head 49 when the slider 16 is moved in the upward direction of FIG. 8.

The operation of the described contact bridges should be now readily apparent. The slider 16 is tensioned by the tongues 23 in one or the other of the stop positions resiliently against the contacts engaged by one or the other of the contact bridges 30. The contact bridges 33 and 41, in that they are flexible, operate separately so that a uniform contacting and a uniform contact pressure is secured across the contact bridges. Since the contact tongues 42 are slidably engaged and therefore have a self-cleaning or wiping effect, a good contact is ensured for the lamp 44. The contact bridge 41 and, the participating contact heads 38, 36, 37 and 49 can be electrically arranged such that, a two-step switching of the lamp 44 is provided so that it can be switched as a continuous light and also as a flashing or intermittent light. The cap 19 of the warning flashing switch stands basically above the periphery of the steering column switch. The slider 16 is integrated in the inner design of the steering column switch and needs only a narrow peripheral section.

An alternate form or embodiment of a warning flashing switch is illustrated in FIGS. 11-17. Here, as in the above described embodiment, the contact heads 12 are arranged within an annular section 11 of the conductor plate 3 which is separated by slots 13. An annular shaped slider 16' is illustrated in individual front views in FIGS. 15-17. The slider 16' is slidingly guided within the slots 13. The slider 16' has a frame-type design and has two toothed racks 50, each of which extends into one of the slots 13. Only the tips of the teeth of tooth racks 50 extend from the slots 13. The slider 16' has two pins 29' serving as shoulders for a contact bridge 30'. The contact bridge 30' rests against one pin 29' in either position of the slider 16. This contact bridge 30' corresponds to both triangular contact bridges 30 of the previously described embodiment. The contact bridge 30' also forms the stops for limiting the movement of the slider 16'. In a chamber 51 of the slider 16' are inserted two contact bridges 33' formed as rectangular plates which always lie with one end on the contact head 36 forming a bridge over to another contact head 37 or 38 respectively.

Each contact bridge 33' is provided with a pair of dimples 52 into which is disposed one end of a pair of an expansion springs 53 respectively. The other end of each of the expansion springs 53 terminates in a pair of dimples 54 of the leg 45 formed in a lamp contact bridge 41. The expansion springs 53 provide a pre-stressing contact pressure for both the contact bridge 33 as well as for the lamp contact bridge 41. The contact bridges 33', as well as the lamp contact bridge 41 carries a bent off shoulder 55 (FIG. 12) that serves as a reflector for the lamp 44.

Figure 13:
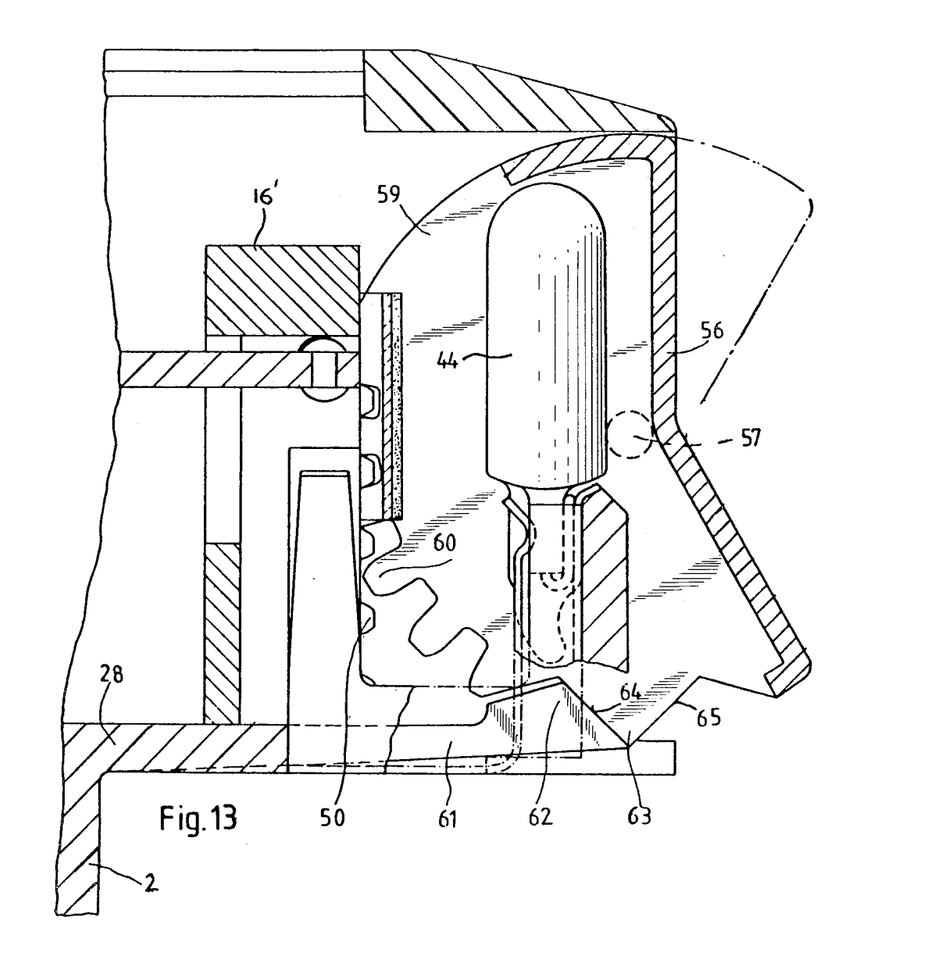
FIG. 13 is a view taken along Line XIII—XIII of FIG. 12.
Figure 14:
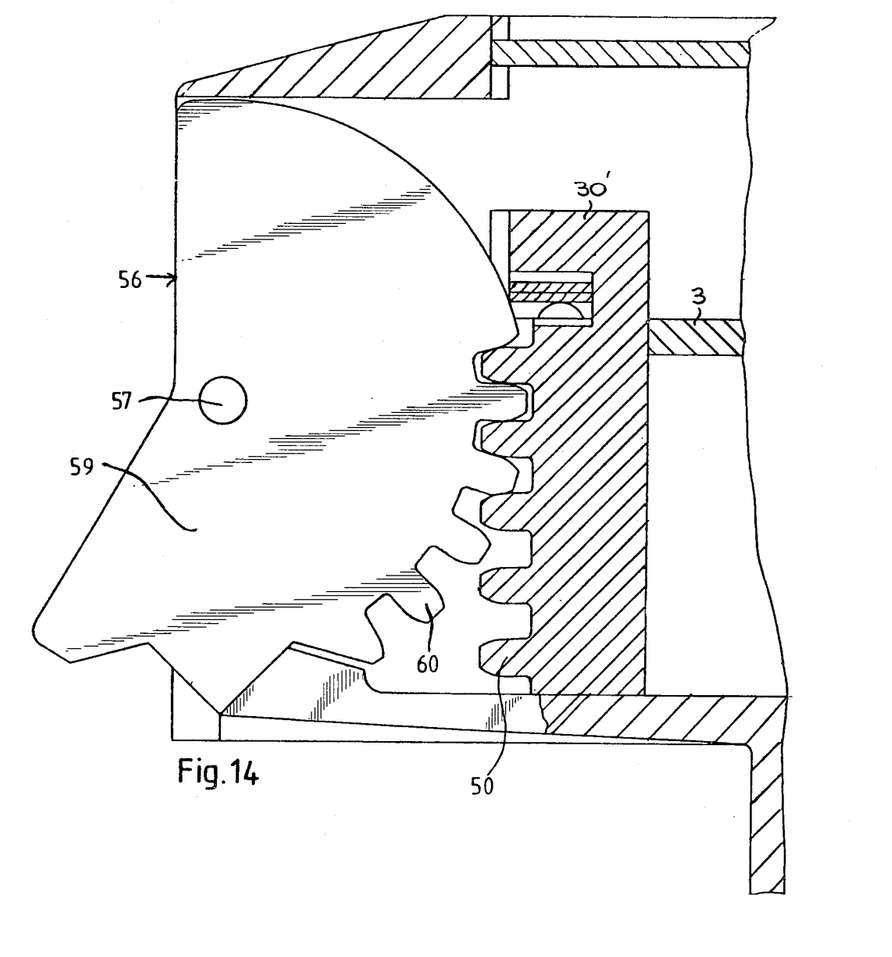
FIG. 14 is a sectional view, with portions removed, taken along Line XIV—XIV in FIG. 12.
Figures 15, 16, 17:
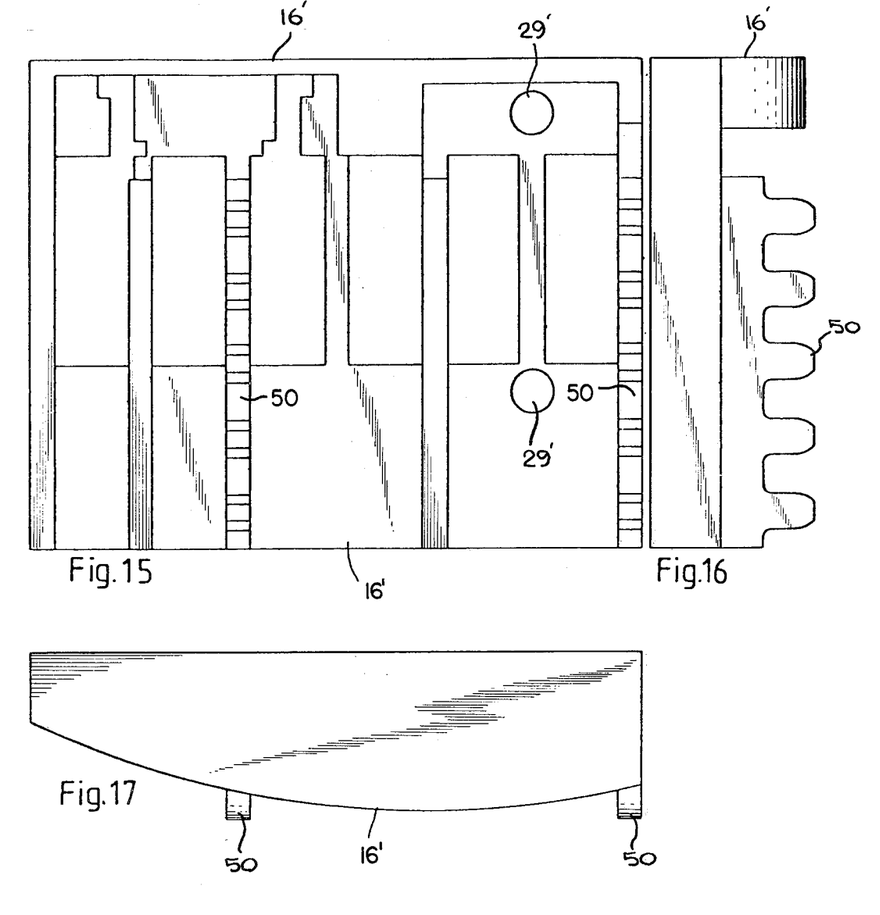
FIG. 15 is a front view of the slider of the alternate embodiment.
FIG. 16 is a left end view of the slider of FIG. 15.
FIG. 17 is a top view of the slider of FIG. 15.

The actuation of this warning flashing switch is done by means of a rocker type switch 56 supported by pins 57 and projections 58 of the peripheral wall 14. The rocker switch 56 has perpendicular to the pins 57 two side walls 59 having toothed segments 60 (FIG. 13). The toothed segments 60 mesh with the respective slots 13 so that the slots 13 are equally used for a lateral guiding of the toothed segments 60 and as an area in which the toothed segments 60 can mesh with the toothed racks 50.

Seated on the bottom 28 of the housing 2 is a web 61 with a triangular locking profile 62 cooperating with a counter-profile 63 of each side wall 59. The web 61 is pre-stressed, so that there is always a flange of the locking profile 62 in mesh with a flange 64 or 65 respectively of the counter-profile 63. The stop positions of the switch are therefore always resiliently fixed.

This warning flashing switch can be integrated into the steering column switch much as the previously described embodiment. Furthermore, no substantial space in the radial direction is required.

Thus there has been provided a steering column switch with a warning flasher switch that fully satisfies the objects, aims and advantages set forth above. It is evident that many alternatives, modifications, and variations will be apparent to those skilled in the art. Accordingly, it is intended to embrace all such variations as fall within the spirit and broad scope of the appended claims.

What is claimed is:

1. In combination with an automobile steering column switch which is disposed about a steering column spindle and has therein a conductor plate in a plane perpendicular to the axis of the steering column spindle, the conductor plate having thereon various electrical circuits which are rendered operative by means of switching levers to control windshield wiper functions, direction light indicator functions and the like of the automobile, a warning flashing switch which fits easily into the steering column switch and controls the warning flashing light functions of the automobile, comprising:

a switching slider having an annular portion substantially corresponding to the peripheral contour of said conductor plate and proportioned to be disposed between said conductor plate and the housing of said steering column switch, an activating member on the exterior of said housing and coupled to said switching slider for slidably operating said switching slider perpendicular to the plane of said conductor plate, said conductor plate having various electrical circuits on the opposite sides thereof and an outer annular portion, a plurality of electrical contacts on said outer annular portion which project on each of the opposite sides of said conductor plate and which are in electrical contact with said various electrical circuits for controlling the warning flashing light functions, said switching slider having thereon a plurality of contact bridges which upon activation of said switching slider by said activating member contacting one of said electrical contacts on said outer annular portion of said conductor plate to establish the electrical circuits to operate the warning flashing light functions of the automobile, at least two of said plurality of contact bridges on said switching slider being non-flexible and rigidly affixed to said switching slider on each of the opposite sides of said conductor plate, and cooperating with said electrical contacts on said annular portion of said conductor plate upon actuation of said switching slider to contact said electrical contacts to establish stop positions for said switching slider.

2. The steering column switch of claim 1, wherein said actuating member and said switching slider are affixed together to form a single unit.

3. The steering column switch of claim 1, wherein said switching slider has thereon two toothed racks, and wherein said actuating member is a rocker arm rotatable around a shaft and has a pair of toothed racks thereon which mesh with the toothed racks on said switching slider, whereby rocking said actuating member about said shaft causes said switching slider to slidably move perpendicular to the plane of said conductor plate.

4. The steering column switch of claim 3, wherein a portion of the periphery of said actuating member is a circular segment with said toothed rack thereon and is arranged symmetrically with respect to said rocker arm, said conductor plate having slots in its outer annular portion to guide said toothed rack of said actuating member and said toothed rack of said switching slider.

5. The steering column switch of claim 1, further comprising yielding tongue members on said switching slider which cooperate with a stationary diamond-shaped locking profile to aid in maintaining said switching slider in its stop positions.

6. The steering column switch of claim 5, wherein said tongue members have ends which are received and guided in grooves formed in the edges of said diamond-shaped locking profile.

7. The steering column switch of claim 5, further comprising a spring member connecting said two tongue members thereby drawing said tongue members towards one another and thus against said locking profile therebetween.

8. The steering column switch of claim 3, wherein said rocker arm cooperates with a locking profile that is resiliently engaged with said rocker arm.

9. The steering column switch of claim 1, wherein said non-flexible contact bridges are triangular in shape having a center web and two legs, a pair of pins which are rigidly affixed to said switching slider, said non-flexible contact bridges being affixed to said pins, said center webs being the contact areas of said non-flexible contact bridges.

10. The steering column switch of claim 1, wherein two others of said plurality of contact bridges are flexible contacts, said two other flexible contact bridges being operable to engage and to extend respectively from one of said plurality of electrical contacts on said annular outer portion of said conductor plate to an adjacent but separate one of said plurality of electrical contacts.

11. The steering column switch of claim 1, wherein said conductor plate has at least a pair of slots in its annular outer portion, said switching slider having thereon a pair of webs which are positioned and slidably retained within the respective ones of said pair of slots to align and to guide said switching slider when operated by said actuating means.

* * * * *